March 8, 1932.  V. NOVELLI  1,848,377

INSTRUMENT BOARD

Filed Sept. 12, 1930

Inventor:
Vincenzo Novelli
By Monroe A. Miller
Attorney.

Patented Mar. 8, 1932

1,848,377

UNITED STATES PATENT OFFICE

VINCENZO NOVELLI, OF PETERSBURG, VIRGINIA

INSTRUMENT BOARD

Application filed September 12, 1930. Serial No. 481,561.

The present invention relates to instrument boards for automobiles, and aims to provide a novel and improved supplementary instrument board attachment for mounting instruments in addition to those with which the machine may be equipped.

Another object of the invention is the provision of an instrument board adapted especially for use on Ford automobiles.

A further object is the provision of novel means for attaching the instrument board to the vehicle body.

With the foregoing and other objects in view, which will be apparent as the description proceeds, the invention resides in the construction and arrangement of parts, as hereinafter described and claimed, it being understood that changes can be made within the scope of what is claimed without departing from the spirit of the invention.

The invention is illustrated in the accompanying drawings, wherein—

Figure 1:
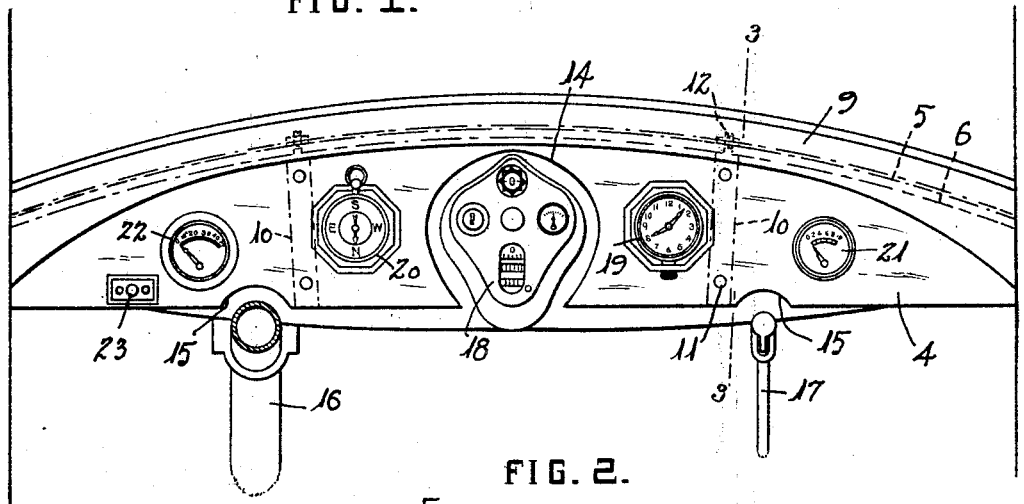
Figure 1 is a face view of the instrument board secured in the automobile body.
Figure 2:
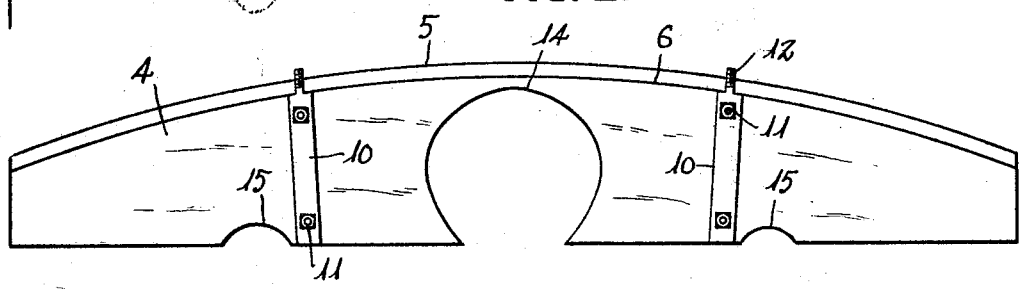
Fig. 2 is a reverse view of the instrument board itself.
Figure 3:
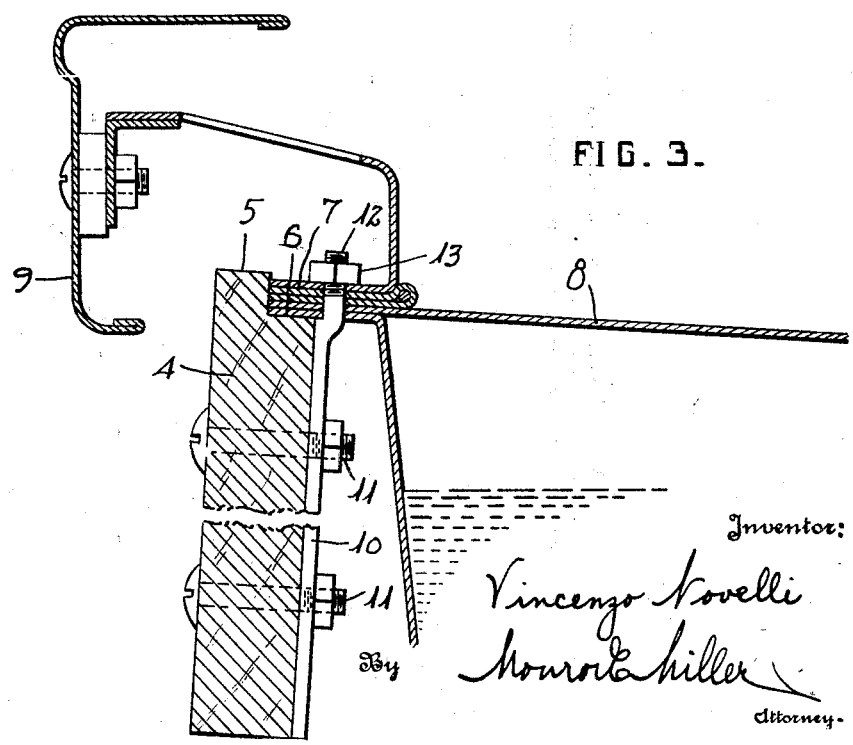
Fig. 3 is an enlarged section on the line 3—3 of Fig. 1.

The instrument board 4 may be of wood, metal or other suitable material, and has the upper curved edge 5 which conforms to the cowl of the automobile. The board 5 has a rabbet 6 along its upper edge to fit the portions 7 at the rear edge of the cowl 8 of a Ford or other automobile, the upper edge portion of the board being disposed in front of the air deflector and shield 9 of the windshield ventilator.

In order to secure the board in place upright bars 10 are secured by bolts 11 or otherwise to the back of the board 4 and are formed at their upper ends with threaded stems 12 that pass upwardly through apertures formed in the portions 7, and nuts 13 are threaded on said stems, thereby clamping the board tightly against the portions 7, with said portions fitting in the rabbet 6, so that the board is rigid.

The board 4 has a cut-out portion or opening 14 between its ends and notches or recesses 15 in its lower edge between the opening 14 and ends of the board. One of the notches 15 accommodates the steering column 16 and the other notch accommodates the operating means 17 of the primer, while the opening 14 accommodates the instrument unit 18 of a Ford automobile, whereby the unit 18 and board 4 are substantially flush, thereby giving the appearance of a permanent instrument board for the automobile with the instrument unit 18 set therein.

The board 4 may carry any suitable instruments in addition to the stock instruments of the unit 18, such as a clock 19, compass 20, gages 21 and 22, parking light switch 23, and the like.

The instrument board gives the sub-cowl portion of the vehicle body a finished and attractive appearance, and the board may be readily attached after providing apertures in the portions 7 below the windshield (not shown).

Having thus described the invention, what is claimed as new is:

A device of the character described comprising a supplementary instrument board having an opening to receive the standard instrument unit of an automobile and having a rabbet along its upper edge to receive the rear edge portion of the cowl of an automobile body, members secured to said board and having upwardly extending stems to pass through said edge portion, an means engageable on said stems for clamping the board to said edge portion.

In testimony whereof I hereunto affix my signature.

VINCENZO NOVELLI.